United States Patent [19]
Domann

[11] Patent Number: 4,645,345
[45] Date of Patent: Feb. 24, 1987

[54] ROTATION RATE MEASURING INSTRUMENT HAVING REDUCED REFLECTION INTERFERENCE

[75] Inventor: Günter Domann, Stuttgart, Fed. Rep. of Germany

[73] Assignee: Standard Elektrik Lorenz Aktiengesellschaft, Stuttgart, Fed. Rep. of Germany

[21] Appl. No.: 734,007

[22] Filed: May 14, 1985

[30] Foreign Application Priority Data

May 17, 1984 [DE] Fed. Rep. of Germany ....... 3418288

[51] Int. Cl.$^4$ ............................................. G01B 9/02
[52] U.S. Cl. ................................... 356/350; 350/96.14
[58] Field of Search ................ 356/350; 350/355, 356, 350/96.13, 96.14, 96.12

[56] References Cited

U.S. PATENT DOCUMENTS 4,573,795 3/1986 Auch et al. ......................... 356/350

FOREIGN PATENT DOCUMENTS 3104786 9/1982 Fed. Rep. of Germany ...... 356/350
3123163 5/1983 Fed. Rep. of Germany ...... 356/350
3136688 7/1984 Fed. Rep. of Germany ...... 356/350

Primary Examiner—Vincent P. McGraw
Assistant Examiner—S. A. Turner
Attorney, Agent, or Firm—T. L. Peterson; J. S. Christopher

[57] ABSTRACT

A rotation rate measuring instrument for measuring the rotation rate of a fiber gyro having a light source, a series of beam splitters, a phase modulator, a coiled optical waveguide and an evaluating circuit provides a first and second light beam which traverse the coiled optical waveguide in opposite directions. At least one of the light beams is modulated at an angular frequency $\omega m$ in the phase modulator while at least one of the light beams is further modulated at a second frequency $\omega s$. The frequencies are distinguishable in the evaluating circuit permitting the suppression of signal components caused by light reflected at the boundaries of the phase modulator.

9 Claims, 4 Drawing Figures

ROTATION RATE MEASURING INSTRUMENT HAVING REDUCED REFLECTION INTERFERENCE

BACKGROUND OF THE INVENTION

1. Field of the Invention

The invention relates generally to measuring instruments and more particularly to instruments for measuring the rotation rate of a fiber gyro.

2. Description of the Prior Art

In a fiber gyro, a light beam is split into two component beams which travel through an optical fiber in opposite directions. The phase difference between the two component beams emerging from the optical fiber is a measure of the rotation rate of the optical fiber. An alternating voltage signal derived from the two component beams is employed to evaluate the phase difference $\phi_s$ between the component beams. An instrument of the type described herein is discussed in German patents DE-OS Nos. 31 36 688 and 31 23 163. Both patents describe an optical system having a modulated light beam. Patent DE-OS 31 36 688 describes a system, in which at least one of the two light beams to be coupled in a coiled optical waveguide is frequency-modulated. The second patent DE-OS 31 23 163 discloses a device in which at least one light beam is phase-modulated.

In integrated optical devices, phase modulation or frequency modulation is frequently utilized. The material commonly used for such integrated optical devices is LiNbO3, which has a higher refractive index (n approximately equals 2.2) than the material utilized in a coiled optical waveguide (n approximately equals 1.47) employed. A problem results in that reflections of the light beam occur at a junction where the light is coupled into a phase modulator from an optical fiber carrying the light beam, that is, reflections at the transition from the optical fiber to the phase modulator. The reflections of the light beam produce signal components which interfere with the evaluation of the modulated output signal. This is particularly the case if the reflected light beams are modulated at the same frequency as the component beams to be evaluated. Such interference is usually not troublesome if the light used has a short coherent wavelength. However, if the light used has a long coherent wavelength, the interference is greater but may be advantageous in certain situations such as when higher frequency stability is required. Notwithstanding these advantages, the interference in the modulated output signal resulting from the reflected light beam signal components continue to exist.

SUMMARY OF THE PRESENT INVENTION

It is therefore an object of the present invention to provide an improved rotation rate measuring instrument capable of reducing the interference caused by reflections of coupled light beams.

It is a further object to provide an improved rotation rate measuring instrument capable of separating useful optical radiation from undesirable optical radiation.

It is a further object to provide an improved rotation rate measuring instrument capable of realizing the use of both fiber-optic waveguides and integrated optical waveguides simultaneously.

It is a further object to provide an improved rotation rate measuring instrument capable of employing a light source having long coherent wavelengths.

Briefly, a preferred embodiment of the present invention includes an instrument for measuring the rotation rate of a fiber gyro having a light source which provides an incident light beam which passes through a series of beam splitters. The components of incident light exiting the beam splitters are directed to a phase modulator and a coiled optical waveguide. An output optical signal is directed to an optical-to-electrical transducer, a band pass filter and an evaluating device.

Within the rotation rate measuring instrument, two light beams provided by the beam splitter traverse the coiled optical waveguide in opposite directions. At least one of the light beams is modulated at a first frequency ($\omega_m$) before being coupled into the coiled optical waveguide. The Sagnac phase difference between the two light beams exiting the coiled optical waveguide is electrically evaluated in the evaluating device. At least one of the modulated light beams is further modulated at a second frequency ($\omega_s$) before entering the coiled optical waveguide. The second frequency is chosen such that the first frequency and the second frequency are separable from each other during the electrical evaluation. During the evaluation of the phase components for measuring the rotation rate, only signal components having a frequency equal to the first frequency ($\omega_m$) are evaluated and other reflected signal components having a frequency equal to the second frequency ($\omega_s$) and comprised of light reflected at the boundaries of the phase modulator are suppressed by the bandpass filter to minimize interference.

An advantage of the rotation rate measuring instrument of the present invention is that the interference caused by the reflections of coupled light beams is reduced.

Another advantage is that the rotation rate measuring instrument is capable of separating useful optical radiation from undesirable optical radiation.

A further advantage is that the rotation rate measuring instrument is capable of simultaneously realizing the use of both fiber-optic waveguides and integrated optical waveguides.

A further advantage is that the rotation rate measuring instrument is capable of employing a light source having long coherent wavelengths.

These and other objects and advantages of the present invention will no doubt become obvious to those of ordinary skill in the art after having read the following detailed description of the preferred embodiment(s) which are illustrated in the various drawing figures.

IN THE DRAWING

The invention will now be explained in more detail by way of example with reference to the accompanying drawings, in which.

DETAILED DESCRIPTION OF THE PREFERRED EMBODIMENT

Figure 1:
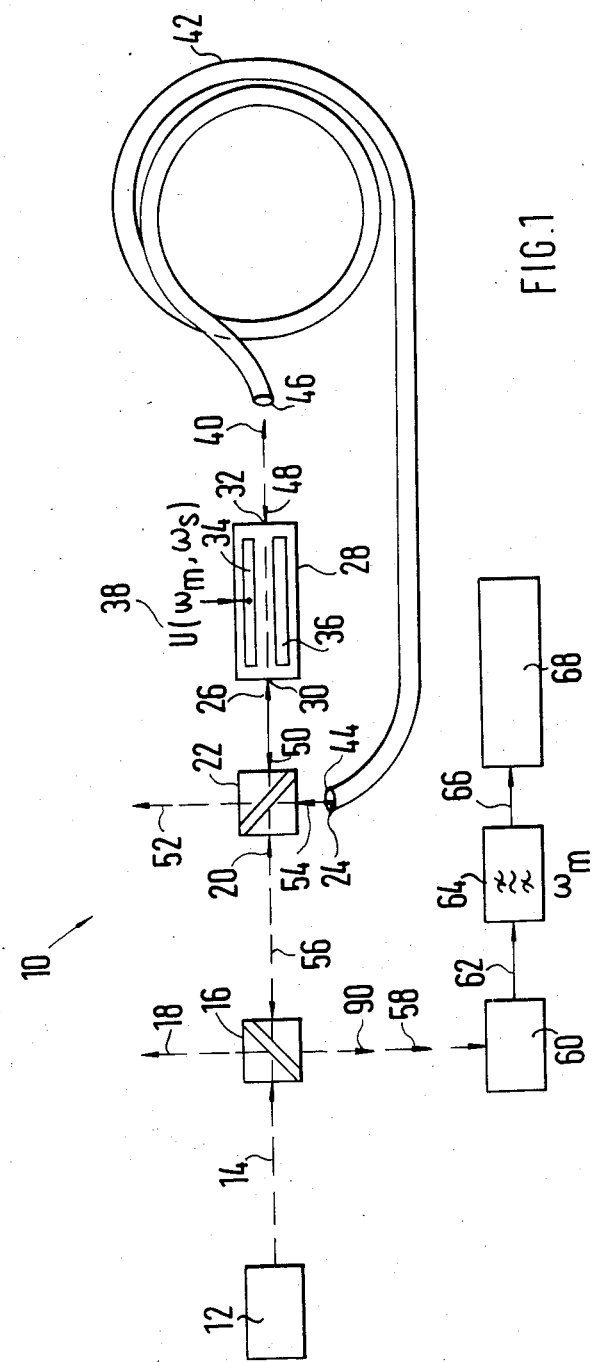
FIG. 1 is a schematic representation of a rotation rate measuring instrument in accordance with the present invention.

FIG. 1 illustrates a rotation rate measuring instrument referred to by the general reference character 10 and incorporating the present invention. The measuring instrument 10, which is employed for measuring the rotation rate of a fiber gyro, includes a light source 12, an incident light beam 14, a first beam splitter 16, a first angled light beam 18, a directed beam 20, a second beam splitter 22, a deviated beam 24, a transmitted beam 26, a phase modulator 28 having a first port 30, a second port 32, a first electrode 34 and a second electrode 36, a driving function 38, a modulated transmitted beam 40, an optical waveguide 42 having a first end 44 and a second end 46, a guided deviated beam 48, a modulated deviated beam 50, a second angled light beam 52 and a guided-modulated transmitted beam 54. FIG. 1 further includes a composite beam 56, a deflected composite beam 58, an optical-to-electrical transducer 60, an electrical output signal 62, a bandpass filter 64, a filtered output signal 66 and an evaluating device 68.

The incident beam 14 produced in the light source 12 passes through the first beam splitter 16, the second beam splitter 22 and enters the phase modulator 28, which is an integrated optical waveguide. The first beam splitter 16 transmits the directed beam 20 (which is one-half of the incident light beam 14) to the second beam splitter 22 and deflects the first angled light beam 18 (the other portion of the incident light beam 14) through 90°. The first angled light beam 18 will not be considered in the following. The second beam splitter 22 passes the transmitted beam 26 which is a portion of the incident light beam 14 and deflects the deviated beam 24, which is the remaining portion of the incident light beam 14, through 90°. The deviated beam 24 is optically coupled to the first end 44 of optical waveguide 42. The transmitted beam 26 which is not deviated in direction enters the phase modulator 28, is modulated in phase therein and is thereafter optically coupled to the second end 46 of the optical waveguide 42. The optical waveguide 42 is a coiled optical fiber. Thus, the measuring instrument 10 simultaneously realizes the use of both the phase modulator 28, which is an integrated optical waveguide and waveguide 42, which is a fiber optic waveguide. The optical waveguide 42 has several turns which form the coil, however this construction is not absolutely necessary. A single turn enclosing a specified area is adequate, the shape of the enclosed area being of little consequence. After traversing the optical waveguide 42, the deviated beam 24 passes through the phase modulator 28 and the modulated deviated beam 50 is directed to the second beam splitter 22 via the first port 30 of the phase modulator 28 while the guided-modulated transmitted beam 54 is also directed to the second beam splitter 22 from the first end 44 of waveguide 42. The second beam splitter 22 again transmits a portion of the modulated-deviated beam 50 and a portion of the guided-modulated transmitted beam 54 combining the two forming the composite beam 56 while the non-transmitted portion of the components of composite beam 56 is deflected through 90° as the second angled light beam 52. The first beam splitter 16 is struck by the composite beam 56 which was produced by a combination of the beam 50 and the beam 54 having traversed the optical waveguide 42 in opposite directions. One-half of the composite beam 56 forms the deflected composite beam 58 which is deflected by the first beam splitter 16 to the optical-to-electrical transducer 60. The electrical output signal 62 of the transducer 60 passes through the bandpass filter 64 providing the filtered output signal 66 and is applied to the evaluating device 68. The rotational rate is determined in the evaluating device 68 as described in the prior art reference DE-OS 31 36 688 as previously recited and will not be repeated herein. The novel bandpass filter 64 is not present in the known prior art.

In the novel measuring instrument 10, the phase modulator 28 is placed ahead of the second end 46 of the waveguide 42, that is, only the second end 46 of the optical waveguide 42 is preceeded by the phase modulator 28. However, the phase modulator 28 may be connected ahead of the first end 44 of the waveguide 42. Although modulation within the phase modulators of the prior art was effected at the angular frequency $\omega_m$ (where $\omega_m = 2\pi f_m$, $f_m$ being the modulation frequency) and driven by a drive signal U which is a function of $\omega_m$, the phase modulator 28 of the present invention is driven at two frequencies $\omega_m$ and $\omega_s$. It is possible to feed the two drive signals $\omega_m$ and $\omega_s$ to two separate phase modulators arranged one behind the other or to electronically combine the two signals $\omega_m$ and $\omega_s$ and feed the combined signal to a single modulator. The following discussion assumes that the two signals $\omega_m$ and $\omega_s$ are first combined and that only one modulating signal containing the two components $\omega_m$ and $\omega_s$ is then fed to the phase modulator 28. The bandpass filter 64 used in the novel measuring instrument 10 has a midfrequency $\omega_m$ so that only signal components having the frequency $\omega_m$ reach the evaluating device 68 while signal components having the frequency $\omega_s$ are rejected. As a result, the radiation of light beams caused by reflection is no longer disturbing because all reflected light beams are modulated at the frequency $\omega_s$ as will be explained in reference to FIG. 2. However, in lieu of placing the bandpass filter 64 ahead of the evaluating device 68, the evaluating device 68 can be implemented to process only signals of frequency $\omega_m$. An example would be in a case in which the evaluating device 68 includes a lock-in amplifier with a time constant $$\tau >> (1/2\pi f_s) \qquad (1)$$

where $f_s$ is the second modulation frequency.

To make the novel solution easier to understand, the evaluation concept in the known prior art measuring instrument will first be briefly explained. In the known instrument, the phase modulator 28 is driven by the signal $$U = U_o \cdot \cos \omega_m \cdot t = U_o \cdot \cos 2\pi f_m \cdot t \sim \phi_o \cos 2\pi f_m \cdot t \qquad (2)$$

where $U_o$ = peak modulating voltage,
$\omega_m = 2\pi f_m$ = angular frequency of the drive signal used for modulation,
t = time,
$\phi_o$ = phase deviation, and $$\omega_m \text{ is chosen to be equal to } (\pi \cdot c / n \cdot L), \qquad (3)$$

where
c = velocity of light in a vacuum
n = refractive index of the optical waveguide
L = length of the optical waveguide.

If the phase modulator of the prior art is driven by the signal U whereby phase modulation is effected at the frequency $\omega_m$, the electrical output signal of the optical-to-electrical transducer provides, inter alia, a signal $$i_o \sim \sin 2\phi_s \cdot J_1(2\phi_o) \cdot \cos 2\pi f_m \cdot t + c_1, \tag{4}$$

where
$\phi_s$ = Sagnac phase difference between the component beams having traversed the optical waveguide in opposite directions,
$J_1(2\phi_o)$ = Bessel function of the first kind, and
C1 = constant.

Figure 2:
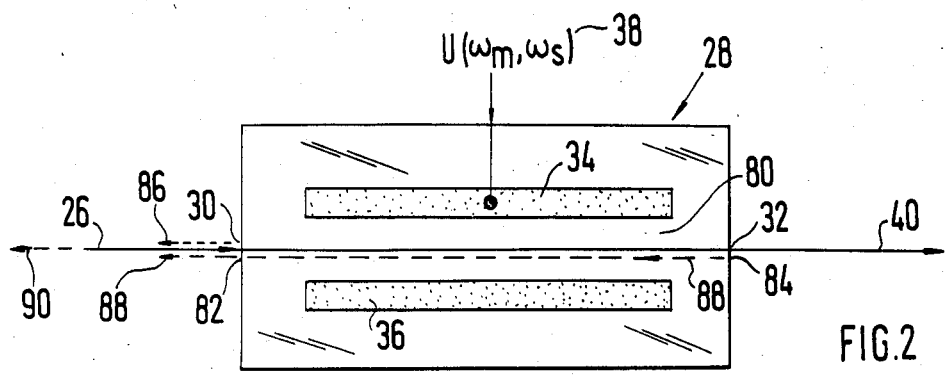
FIG. 2 is an enlarged schematic representation of a phase modulator of the rotation rate measuring instrument of FIG. 1.

FIG. 2 illustrates the phase modulator 28 which is a conventional electro-optical modulator in which a substrate optical waveguide 80 is implemented in an LiNbO3 substrate and which has the first electrode 34 and the second electrode 36 located at the surface of the substrate optical waveguide 80. The first electrode 34 is presented with the drive signal U which is a function of the combined angular frequencies $\omega_m$ and $\omega_s$ and not just a function of the angular frequency $\omega_m$ as in the instrument of the prior art. The drive signal $U(\omega_m \cdot \omega_s)$ is then applied to the phase modulator 28 in the form $$U = U_o \cdot \cos \omega_m \cdot t + Q \cdot U_o \cos \omega_s \cdot t. \tag{5}$$

Note that the signals $\omega_m$ and $\omega_s$ could be applied to the modulator 28 separately with the first electrode 34 being divided from the second electrode 36 with each electrode supplied with one signal $\omega_m$ or $\omega_s$. FIG. 2 further includes a first boundary 82 adjacent to the first port 30 and a second boundary 84 adjacent to the second port 32 of the phase modulator 28. When the transmitted beam 26 strikes the phase modulator 28, a first portion 86 (shown dotted) of the transmitted beam 26 is reflected at the first boundary 82 when the transmitted beam 26 enters the modulator 28. When the modulated transmitted beam 40 exits the modulator 28, a second portion 88 (shown dotted) is reflected at the second boundary 84. The reflected second portion 88 is superimposed onto the reflected first portion 86 to form a superimposed reflected beam 90. In the known solution of the prior art, the reflected second portion 88 is modulated at angular frequency $\omega_m$ while the reflected first portion 86 remains unmodulated. Thus, the superimposed reflected beam 90 is modulated at angular frequency $\omega_m$ which is the same frequency as the electrical output signal 62 ($i_o$) which is to be evaluated. In this situation, the superimposed reflected beam 90 cannot be separated or distinguished from the useful composite beam 56. Note that the reflected second portion 88 of the modulated transmitted beam 40 may be reflected several times. This fact may be neglected since qualitatively this simplification does not alter the following considerations.

In the novel measuring instrument 10, the reflected second portion 88 is modulated at the angular frequencies $\omega_m$ and $\omega_s$ while the reflected first portion 86 remains unmodulated. The superimposed reflected beam 90 formed by the superposition of the first portion 86 and the second portion 88 contains components with the frequencies $$X \cdot \omega_m \pm Y \cdot \omega_s \tag{6}$$

where (x, y) are integers. Equation 6 shows that only a term containing angular frequency $\omega_m$ remains in the equation for the superimposed reflected beam 90. If the terms containing the frequency $\omega_m$ in the superimposed reflected beam 90 are set equal to zero, then only terms containing the frequency $\omega_s$ will remain and the frequency $\omega_s$ will be blocked by the bandpass filter 64 permitting only electrical output signals 62 of the frequency $\omega_m$ of the deflected composite beam 58 to reach the evaluating device 68. A phase difference between the angular frequencies $\omega_m$ and $\omega_s$ between the superimposed reflected beam 90 and the deflected composite beam 58 is produced and chosen to compensate for the Sagnac phase difference $\phi_s$. The optical-to-electrical transducer 60 is utilized to provide the electrical output signal 62 for evaluating the phase difference between the angular frequencies $\omega_m$ and $\omega_s$. The phase difference between the angular frequencies $\omega_m$ and $\omega_s$ may be provided by frequency modulation or phase modulation. In the preferred embodiment of FIG. 1, the phase modulation is provided by the phase modulator 28. It must be insured that the superimposed reflected beam 90 does not contain components of angular frequency $\omega_m$. Then any remaining components of angular frequency $\omega_m$ belong to the deflected composite beam 58 to be evaluated. Thus, it is necessary to strictly distinguish between the deflected composite beam 58 (the desired light) modulated at frequency $\omega_m$ (that is, the guided deviated beam 48 and the guided modulated transmitted beam 54 emerging from the optical waveguide 42) and the superimposed reflected beam 90 (the undesired light) modulated at frequency $\omega_m$ (that is, the first portion 86 of transmitted beam 26 and the second portion 88 of modulated transmitted beam 40 reflected at the first boundary 82 and the second boundary 84. The components of frequency $\omega_m$ become zero only in the undesired light which also contains components of angular frequency $\omega_s$ which is blocked by the bandpass filter 64 and thus do not interfere with the evaluation. The term containing the frequency $\omega_m$ in equation 6 can be made zero by a suitable choice of $Q \cdot U_o$ in the second term of equation 5 and the term containing the frequency $\omega_m$ in equation 6 becomes zero if the Bessel function $$J_o(2\phi_o \cdot Q) = 0 \tag{7}$$

where $\phi_o$ is the phase deviation corresponding to the drive voltage $U_o$. Thus, the superimposed reflected beam 90 does not contain components having the frequency $\omega_m$ but only components of frequency $\omega_s$ or multiples thereof. During evaluation, the superimposed reflected beam 90 can be readily separated from the useful deflected composite beam 58 which contains components of the frequency $\omega_m$ by utilizing the bandpass filter 64. As a result the reflected first portion 86 and the reflected second portion 88 at the first boundary 82 and the second boundary 84 respectively are no longer disturbing during evaluation. The effect of the additional modulation at the angular frequency $\omega_s$ on the evaluation of the deflected composite beam 58 is negligible if $\omega_s << \omega_m$. By example only, possible values for a realization of the preferred embodiment of the novel measuring instrument 10 are:

$\phi \cdot Q = 1.2$ where $\phi$ is the phase deviation corresponding to the driving function U;
$\omega_m = 100$ khz and
$\omega_s = 10$ hz.

Figure 3:
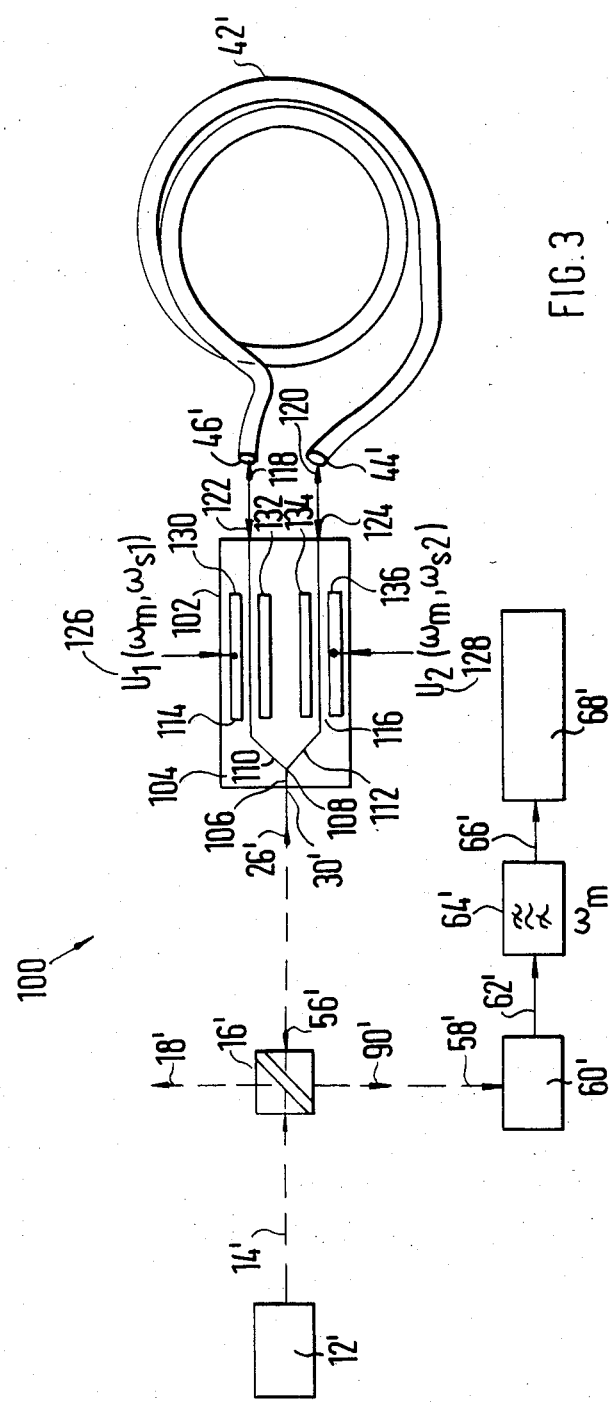
FIG. 3 is a schematic representation of an alternative embodiment of a rotation rate measuring instrument of the present invention.

FIG. 3 illustrates an alternative embodiment of a rotation rate measuring instrument for measuring the rotation rate of a fiber gyro referred to by the general reference character 100 and incorporating the present invention. Those structural elements appearing in the alternative embodiment 100 which are duplicate to those elements in the preferred embodiment 10 are identified by prime designations. FIG. 3 further illustrates an integrated optical device 102 having a substrate 104 comprised for example of LiNbO3 with a substrate optical waveguide 106 formed therein. The waveguide 106 is fashioned to include a Y-junction 108 having a first leg 110 and a second leg 112. The first leg 110 leads to a first phase modulator 114 while the second leg 112 leads to a second phase modulator 116. The first phase modulator 114 and the second phase modulator 116 replace the phase modulator 28 and the second beam splitter 22 of the measuring instrument 10. The remainder of the elements of the measuring instrument 100 and their organization are duplicate to those of the measuring instrument 10 except the coiled optical waveguide 42' which interfaces with the optical waveguide 106 in a different manner as described hereinafter. The transmitted beam 26' enters the integrated optical device 102 via the optical waveguide 106. The transmitted beam 26' is split at the Y-junction 108 with a first portion entering the first leg 110 of the first phase modulator 114 providing a first modulated transmitted beam 118. A second portion of the split transmitted beam 26' enters the second leg 112 of the second phase modulator 116 providing a second modulated transmitted beam 120. Further, a first guided modulated beam 122 enters the first phase modulator 114 from the second end 46' of the coiled optical waveguide 42' and a second guided modulated beam 124 enters the second phase modulator 116 from the first end 44' of the coiled optical waveguide 42'. The first phase modulator 114 is controlled by a drive signal ($U_1$) 126 which is a function of angular frequencies $\omega_m$ and $\omega_{s1}$ while the second phase modulator 116 is controlled by a drive signal ($U_2$) 128 which is a function of angular frequencies $\omega_m$ and $\omega_{s2}$.

Figure 4:
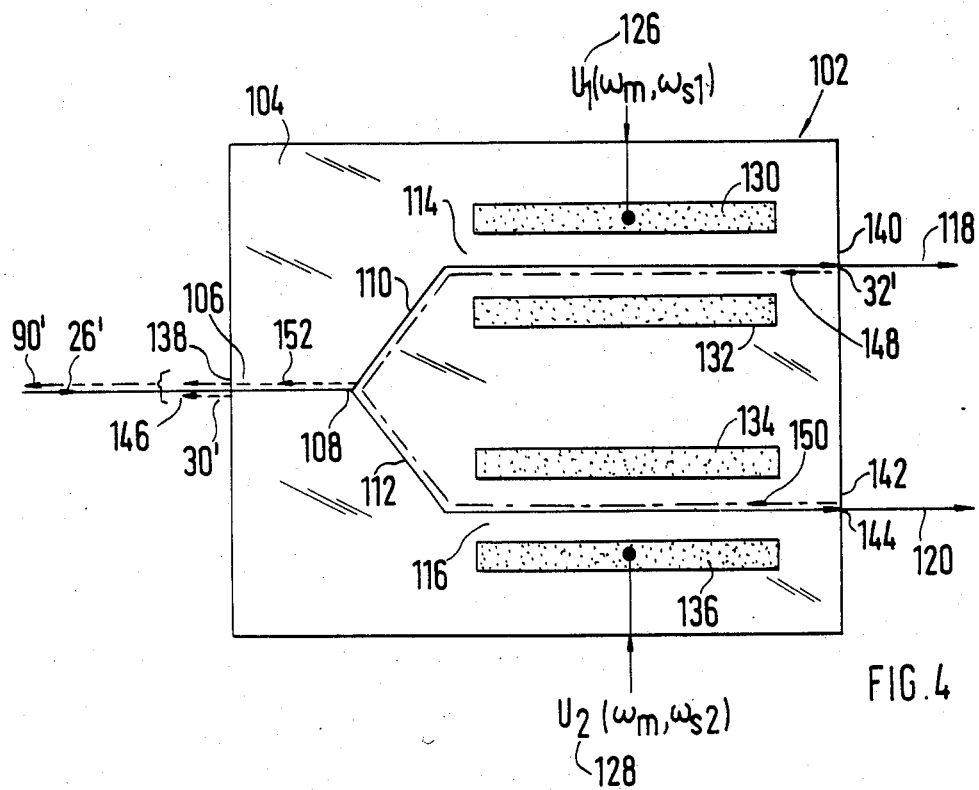
FIG. 4 is an enlarged schematic representation of an integrated optical device of the rotation rate measuring instrument of FIG. 3.

Referring to FIG. 4, the first phase modulator 114 includes a first electrode 130 and a second electrode 132 while the second phase modulator 116 includes a third electrode 134 and a fourth electrode 136. The Y-junction 108 performs the function of the second beam splitter 22 of the measuring instrument 10 illustrated in FIG. 1. From the Y-junction 108, the optical waveguide 106 follows the first leg 110 and extends between the first electrode 130 and the second electrode 132 of the first phase modulator 114. Also, the optical waveguide 106 follows the second leg 112 and extends between the third electrode 134 and the fourth electrode 136 of the second phase modulator 116. The transmitted beam 26', which is separated into the first modulated transmitted beam 118 and the second modulated transmitted beam 120 by the Y-junction 108, strikes the integrated optical device 102 from the left. Both the first end 44' and the second end 46' of the optical waveguide 42' is preceeded by the first phase modulator 114 and the second phase modulator 116, respectively. This structure provides the first modulated transmitted beam 118 which enters the second end 46' of waveguide 42' and the second modulated transmitted beam 120 which enters the first end 44' of the waveguide 42'. The first modulated transmitted beam 118 and the second modulated transmitted beam 120 leave the integrated optical device 102 on the right side and traverse the coiled optical waveguide 42' in opposite directions. In FIG. 4, the transmitted beam 26' and the first and second modulated transmitted beams 118, 120 are shown by solid lines. The integrated optical device 102 further includes a first boundary 138 adjacent to the first port 30', a second boundary 140 adjacent to the second port 32' and a third boundary 142 adjacent to a third port 144. At the first boundary 138, a first portion 146 of the transmitted beam 26' is reflected and is shown by a dotted line. At the second boundary 140, a second portion 148 of the first modulated transmitted beam 118 is reflected and at the third boundary 142, a third portion 150 of the second modulated transmitted beam 120 is reflected. The second portion 148 and the third portion 150, shown by dash-dotted lines, are superimposed at the Y-junction 108 forming a combined reflected beam 152 also shown as a dash-dotted line. Further, the combined reflected beam 152 (shown dash-dotted) is superimposed onto the first portion 146 (shown dotted) of the transmitted beam 26' to form the superimposed reflected beam 90' (shown dot-dot-dashed). The superimposed reflected beam 90' contains components having the angular frequency $\omega_m$ which are disturbing during evaluation. Therefore, the first phase modulator 114 is controlled by the first drive signal 126 which is a function of angular frequencies $\omega_m$ and $\omega_{s1}$ and the second phase modulator 116 is controlled by the second drive signal 128 which is a function of angular frequencies $\omega_m$ and $\omega_{s2}$. Without limitation to generality, $\omega_{s1}$ is set equal to $\omega_{s2}$ and $\omega_s$. The first drive signal 126 for the first phase modulator 114 is $$U_1 = U_o \cos \omega_m \cdot t + Q_1 U_o \cos \omega_{s1} \cdot t \qquad (8)$$

and the second drive signal 128 for the second phase modulator 116 is $$U_2 = U_o \cos \omega_m \cdot t - Q_2 U_o \cos \omega_{s2} \cdot t \qquad (9)$$

where $q_1$ may be equal to $q_2$. Thus, the superimposed reflected beam 90' is modulated at the angular frequencies $\omega_m$, $\omega_{s1}$ and $\omega_{s2}$. If the component frequency $\omega_m$ of the superimposed reflected beam 90' is set equal to zero, then only the component frequencies $\omega_{s1}$ and $\omega_{s2}$ remain. As in the measuring instrument 10, terms $q_1$ and $q_2$ of equations (8) and (9) respectively may be chosen so that the superimposed reflected beam 90' does not contain the component frequency $\omega_m$. The component which includes the angular frequency $\omega_m$ becomes zero if $\phi_o = 1.20$ in equation (7) where $\phi_o$ is the phase deviation corresponding to the drive voltages $U_1$ and $U_2$. During evaluation, the superimposed reflected beam 90' can be readily separated from the useful deflected composite beam 58' which contains components of the frequency $\omega_m$ by utilizing the bandpass filter 64'. As a result, the superimposed reflected beam 90' is no longer disturbing during evaluation. The effect of the additional modulation at the angular frequencies $\omega_{s1}$ and $\omega_{s2}$ on the evaluation of the deflected composite beam 58' is negligible if $\omega_{s1} << \omega_m$ and $\omega_{s2} << \omega_m$. By example only, possible values for a realization of the alternative embodiment of the novel measuring instrument 100 are $\omega_m = 100$ khz and $\omega_s = 10$ hz.

Although the present invention has been described in terms of the presently preferred embodiment(s), it is to be understood that such disclosure is not to be interpreted as limiting. Various alterations and modification will no doubt become apparent to those skilled in the art after having read the above disclosure. Accordingly, it is intended that the appended claims be interpreted as covering all alterations and modifications as fall within the true spirit and scope of the invention.

I claim:

1. A rotation rate measuring instrument comprising, in combination:

a light source for providing an incident beam;

a plurality of beam splitters receiving said incident beam for providing a deviated beam and a transmitted beam;

a phase modulator in optical communication with said plurality of beam splitters, said phase modulator for receiving and modulating said transmitted beam at a combination of angular frequencies including $\omega_m$ and $\omega_s$;

an optical waveguide having a first end and a second end, said first end for receiving said deviated beam and said second end for receiving said modulated transmitted beam, said deviated beam transiting said optical waveguide and being modulated at a combination of angular frequencies including $\omega_m$ and $\omega_s$, said modulated transmitted beam and said modulated deviated beam forming a composite beam, said phase modulator including a boundary at said first end and at said second end wherein a portion of said transmitted beam and a portion of said deviated beam are reflected and modulated at a combination of angular frequencies including $\omega_m$ and $\omega_s$ with said reflected beam component $\omega_m$ being set equal to zero;

a transducing means optically connected to said plurality of beam splitters for transforming said composite beam and said reflected beams to an electrical signal;

a filtering means electrically connected to said transducing means for blocking angular frequencies exclusive of $\omega_m$; and an evaluating means electrically connected to said filtering means for determining a rotation rate wherein said reflected beams are blocked for reducing interference with said evaluating means.

2. The rotation rate measuring instrument of claim 1 wherein said optical waveguide is a coiled optical fiber.

3. The rotation rate measuring instrument of claim 2 wherein said phase modulator is an electro-optical modulator having an optical waveguide implemented in an LiNbO3 substrate and having two surface electrodes, a first of said surface electrodes being presented with a drive signal which is a function of the combined angular frequencies $\omega_m$ and $\omega_s$.

4. The rotation rate measuring instrument of claim 3 wherein said drive signal is defined by the equation $$U = U_o \cos \omega_m t + Q U_o \cos \omega_s t.$$

5. The rotation rate measuring instrument of claim 4 wherein the modulated angular frequencies $\omega_m$ and $\omega_s$ of said reflected transmitted beam and said reflected deviated beam are functionally related by the equation $x \cdot \omega_m \pm y \cdot \omega_s$ where (x,y) are integers.

6. The rotation rate measuring instrument of claim 5 wherein said angular frequency $\omega_m$ is much larger than said angular frequency $\omega_s$.

7. The rotation rate measuring instrument of claim 6 wherein said light source comprises light having long coherent wavelengths.

8. A rotation rate measuring instrument comprising, in combination:

a light source for providing an incident light beam;

a plurality of beam splitters including a first beam splitter and a second beam splitter, said first beam splitter receiving said incident light beam for providing a plurality of light signals, said second beam splitter for providing a deviated beam and a transmitted beam;

a phase modulator in optical communication with said second beam splitter and having a first port and a second port, said first port for receiving said transmitted beam, said transmitted beam being modulated at a combination of angular frequencies including $\omega_m$ and $\omega_s$;

An optical waveguide having a first end and a second end, said first end being aligned with said second beam splitter for receiving said deviated beam and said second end being aligned with said second port of said phase modulator for receiving said modulated transmitted beam, said deviated beam transiting said optical waveguide and entering said phase modulator through said second port, said deviated beam being modulated at a combination of angular frequencies including $\omega_m$ and $\omega_s$, said modulated deviated beam being transmitted to said first beam splitter, said modulated transmitted beam exiting said first end of said optical waveguide and being transmitted to said first beam splitter, said modulated transmitted beam and said modulated deviated beam forming a composite beam, said first port and said second port of said phase modulator each including a boundary wherein a portion of said transmitted beam and a portion of said deviated beam are reflected at their respective boundaries, said reflected transmitted beam and said reflected deviated beam being modulated at a combination of angular frequencies including $\omega_m$ and $\omega_s$ and combined to form a superimposed reflected beam, said $\omega_m$ component of said superimposed reflected beam being set equal to zero;

an optical-to-electrical transducer in optical communication with said first beam splitter for transforming said composite beam and said superimposed reflected beam to an electrical signal;

A bandpass filter in electrical communication with said optical-to-electrical transducer for blocking angular frequencies exclusive of $\omega_m$; and an evaluating means in electrical communication with said bandpass filter for determining a rotation rate wherein said superimposed reflected beam is blocked by said bandpass filter for reducing interference within said evaluating means.

9. A rotation rate measuring instrument comprising, in combination:

a light source for providing an incident light beam;

a beam splitter for receiving said incident light beam and for providing a deflected beam and a transmitted beam;

an integrated optical device in optical communication with said beam splitter and including a plurality of ports, a first port of said plurality of ports for receiving said transmitted beam, said transmitted beam being bisected at a Y-junction located within a substrate of said integrated optical device for providing a first transmitted beam and a second transmitted beam, said first transmitted beam being modulated within a first phase modulator at a combination of angular frequencies including $\omega_m$ and $\omega_{s1}$ for providing a first modulated transmitted beam and said second transmitted beam being modulated within a second phase modulator at a combination of angular frequencies including $\omega_m$ and $\omega_{s2}$ for providing a second modulated transmitted beam;

an optical waveguide having a first end and a second end, said first end being aligned with a second port of said plurality of ports for receiving said first modulated transmitted beam and said second end being aligned with a third port of said plurality of ports for receiving said second modulated transmitted beam, said second modulated transmitted beam transiting said optical waveguide and entering said integrated optical device through said second port and being modulated at a combination of angular frequencies including $\omega_m$ and $\omega_{s1}$, said first modulated transmitted beam transiting said optical waveguide and entering said integrated optical device through said third port and being modulated at a combination of angular frequencies including $\omega_m$ and $\omega_{s2}$, said first modulated transmitted beam and said second modulated transmitted beam being combined to form a composite beam and transmitted to said beam splitter, said first port and said second port and said third port of said integrated optical device each including a boundary wherein a portion of said transmitted beam and a portion of said first and said second modulated transmitted beam are reflected at their respective boundaries, said reflected first modulated transmitted beam and said reflected second modulated transmitted beam being modulated at a combination of angular frequencies including $\omega_m$ and $\omega_{s1}$ and $\omega_{s2}$ and combined with said reflected transmitted beam to form a superimposed reflected beam, said $\omega_m$ component of said superimposed reflected beam being set equal to zero;

an optical-to-electrical transducer in optical communication with said beam splitter for transforming said composite beam and said superimposed reflected beam to an electrical signal;

a bandpass filter in electrical communication with said optical-to-electrical transducer for blocking angular frequencies exclusive of $\omega_m$; and an evaluating means in electrical communication with said bandpass filter for determining a rotation rate wherein said superimposed reflected beam is blocked by said bandpass filter for reducing interference within said evaluating means.

* * * * *